United States Patent
Nakayoshi et al.

(10) Patent No.: US 7,270,464 B2
(45) Date of Patent: Sep. 18, 2007

(54) BACKLIGHT DEVICE AND LIQUID CRYSTAL DISPLAY

(75) Inventors: Hirokazu Nakayoshi, Kanagawa (JP); Kazuo Hashimoto, Kanagawa (JP); Isamu Noguchi, Saitama (JP)

(73) Assignee: Sony Corporation, Tokyo (JP)

( * ) Notice: Subject to any disclaimer, the term of this patent is extended or adjusted under 35 U.S.C. 154(b) by 27 days.

(21) Appl. No.: 10/540,874

(22) PCT Filed: Dec. 22, 2003

(86) PCT No.: PCT/JP03/16419

§ 371 (c)(1),
(2), (4) Date: Jun. 27, 2005

(87) PCT Pub. No.: WO2004/061522

PCT Pub. Date: Jul. 22, 2004

(65) Prior Publication Data
US 2006/0152944 A1    Jul. 13, 2006

(30) Foreign Application Priority Data
Jan. 7, 2003    (JP) .............................. 2003-001435

(51) Int. Cl.
*F21V 7/04*    (2006.01)
(52) U.S. Cl. ...................... 362/613; 362/612; 362/631; 362/633
(58) Field of Classification Search ................ 362/633, 362/612, 630, 631, 613, 634, 26; 349/61, 349/62, 63, 65, 68
See application file for complete search history.

(56) References Cited

U.S. PATENT DOCUMENTS

| 5,400,160 | A  | * | 3/1995 | Takahashi et al. ............ 349/60 |
| 6,195,882 | B1 | * | 3/2001 | Tsukamoto et al. ........... 29/852 |
| 6,417,897 | B1 | * | 7/2002 | Hashimoto ................... 349/65 |
| 6,697,130 | B2 | * | 2/2004 | Weindorf et al. ............. 349/65 |
| 6,862,053 | B2 | * | 3/2005 | Lee et al. ..................... 349/58 |

FOREIGN PATENT DOCUMENTS

| JP | 11-153785   | 6/1999  |
| JP | 2001-184928 | 7/2001  |
| JP | 2002-75038  | 3/2002  |
| JP | 2002-216527 | 8/2002  |
| JP | 2002-350850 | 12/2002 |
| JP | 2003-90993  | 3/2003  |

* cited by examiner

*Primary Examiner*—Alan Cariaso
*Assistant Examiner*—Leah S Lovell
(74) *Attorney, Agent, or Firm*—Oblon, Spivak, McClelland, Maier & Neustadt, P.C.

(57) ABSTRACT

A back-light device and a liquid crystal display in which light from light sources is guided to a light-guiding plate efficiently and heat of the light sources is dissipated efficiently. The back-light device of the liquid crystal panel has a front frame and a rear frame. There are provided four optical sheets, a light-guiding plate, a flexible PCB, two light sources, and a reflecting sheet between the front frame and the rear frame. The flexible PCB has a PCB part and two erected parts. A resistor and a thermistor as electronic parts and two light sources are installed on the PCB part in the vicinity of the erected parts. A light-radiating surface of the light source is pressed to an incident surface of the light-guiding plate by the erected part.

24 Claims, 10 Drawing Sheets

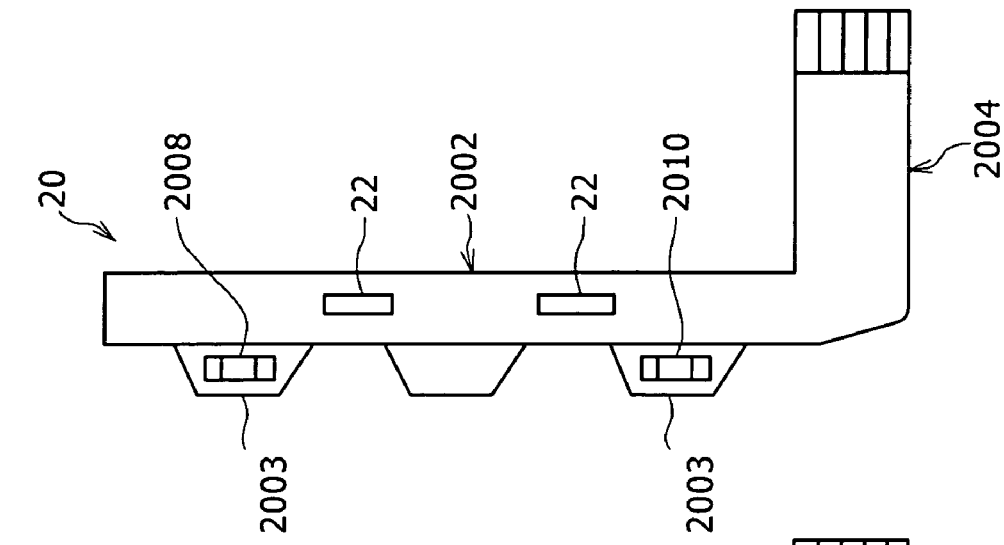
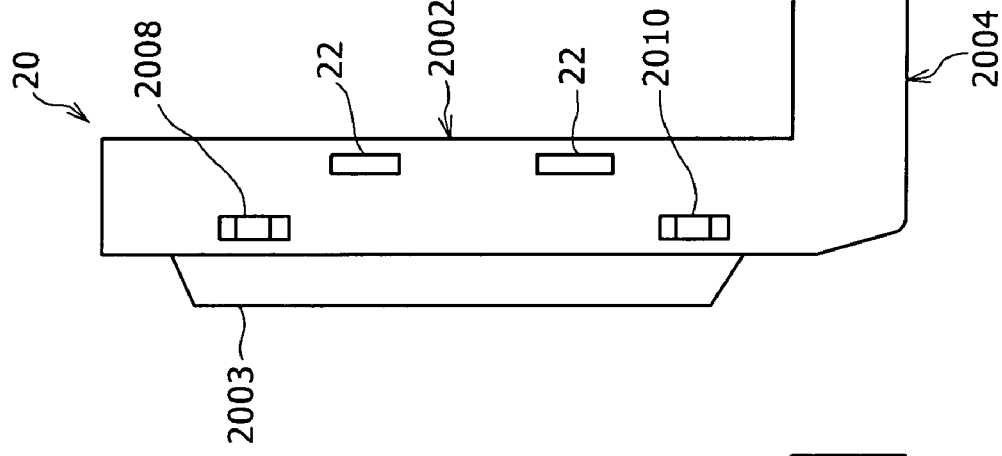
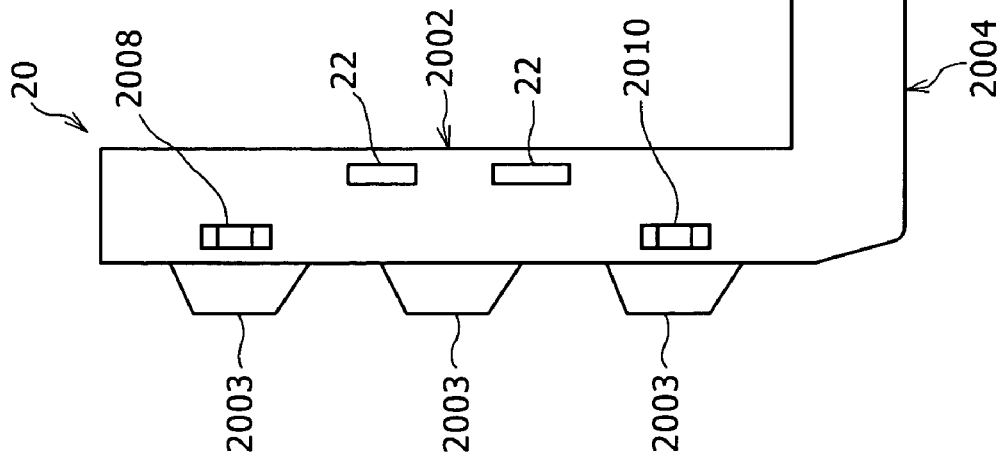

BACKLIGHT DEVICE AND LIQUID CRYSTAL DISPLAY

TECHNICAL FIELD

This invention relates to a back-light device and a liquid crystal display.

BACKGROUND ART

A back-light device to radiate light to the back of a transmission-type liquid-crystal panel is available (patent literature 1), wherein light is radiated from the light-radiating surfaces of LED light sources, enters a light-guiding plate through its incident surface, and is diffused in the light-guiding plate and directed to the back of the liquid-crystal panel.

The back-light device comprises (i) a printed circuit board on which the LED light sources are installed, (ii) the light-guiding plate, (iii) optical sheets which are disposed on one side of the light-guiding plate and direct the light to the back of the liquid-crystal panel, (iv) a reflecting sheet which is disposed on the other side of the light-guiding plate and reflects light toward the liquid-crystal panel, and (v) a frame which houses and holds the above components.

Patent literature 1: Japanese Unexamined Patent Publication No. 2002-75038

The above back-light device has the following problems.

(1) A gap may be left between the light-radiating surfaces of the LED light sources and the incident surface of the light-guiding plate because of assembly errors and parts errors. In this case, it is difficult to guide the light from the light-radiating surfaces to the incident surface efficiently.

(2) It is difficult to dissipate the heat of the LED light sources; accordingly, it is difficult to feed an electric current of high intensity to the light sources.

(3) If the frame is grounded, or earthed, an insulating member has to be provided between the frame and the printed circuit board to insulate the electronic parts installed on the printed circuit board from the frame. The insulating member increases the cost of the back-light device.

Under the circumstances, it is an object of the present invention to provide a back-light device and a liquid crystal display whose manufacturing costs are low and wherein the light from light sources is guided to a light-guiding plate and the heat of light sources is dissipated efficiently.

It is another object of the present invention to provided a back-light device and a liquid crystal display whose manufacturing costs are low and wherein the electronic parts are efficiently insulated from the frame.

DISCLOSURE OF THE INVENTION

To achieve the above objects, the present invention provides a back-light device for shedding light on the back of a liquid-crystal panel. The back-light device comprises a light-guiding plate, a flexible printed circuit board (hereafter called PCB), light sources, and a frame. The light-guiding plate is of the shape of a rectangular plate. Part of one of its four side surfaces, each facing in a direction perpendicular to the directions of its thickness, is formed as an incident surface to allow light to enter. One of its top and bottom surfaces is a light-radiating surface. The flexible PCB is attached to part of the light-guiding plate in the vicinity of the incident surface. The light sources are installed on the flexible PCB. Each light source has a light-radiating surface, which is put in close contact with the incident surface of the light-guiding plate. The frame houses and holds the light-guiding plate and the flexible PCB. The frame has a supporting wall on which the light-guiding plate is put, a window through which the light-radiating surface faces the back of the liquid-crystal panel, and erected walls which are erected at the periphery of the supporting wall. The flexible PCB has a PCB part on which the light sources are installed and erected parts which are erected on the far side of the PCB part away from the incident surface of the light-guiding plate. The light-guiding plate is positioned with respect to the frame in the direction defined between the incident surface and the side surface facing in a direction perpendicular to the directions of the thickness of the light-guiding plate and being opposite to the incident surface by its side surface opposite to its incident surface being in contact with an erected wall of the frame and the erected parts of the flexible PCB being in contact with another erected wall of the frame.

Besides, the present invention provides a liquid crystal display comprising a liquid-crystal panel and a back-light device for shedding light on the back of the liquid-crystal panel. The back-light device comprises a light-guiding plate, a flexible PCB, light sources, and a frame. The light-guiding plate is of the shape of a rectangular plate. Part of one of its four side surfaces, each facing in a direction perpendicular to the directions of its thickness, is formed as an incident surface to allow light to enter. One of its top and bottom surfaces is a light-radiating surface. The flexible PCB is attached to part of the light-guiding plate in the vicinity of the incident surface. The light sources are installed on the flexible PCB. Each light source has a light-radiating surface, which is put in close contact with the incident surface of the light-guiding plate. The frame houses and holds the light-guiding plate and the flexible PCB. The frame has a supporting wall on which the light-guiding plate is put, a window through which the light-radiating surface faces the back of the liquid-crystal panel, and erected walls which are erected at the periphery of the supporting wall. The flexible PCB has a PCB part on which the light sources are installed and erected parts which are erected on the far side of the PCB part away from the incident surface of the light-guiding plate. The light-guiding plate is positioned with respect to the frame in the direction defined between the incident surface and the side surface facing in a direction perpendicular to the directions of the thickness of the light-guiding plate and being opposite to the incident surface by its side surface opposite to its incident surface being in contact with and erected wall of the frame and the erected parts of the flexible PCB being in contact with another erected wall of the frame.

Thus, the erected parts of the flexible PCB put the light-radiating surfaces of the light sources into close contact with the incident surface of the light-guiding plate.

Besides, the heat of the light sources is conducted from the erected parts of the flexible PCB to one of the erected walls of the frame.

Moreover, if the erected parts of the flexible PCB is positioned between the electronic parts installed on the PCB part and the nearby erected wall of the frame, the insulation between the electronic parts and the frame is secured.

BRIEF DESCRIPTION OF THE DRAWINGS

FIGS. 8A, 8B, and 8C show other embodiments of the erected parts of the flexible PCB, wherein the flexible PCB of FIG. 8A has three erected parts, the flexible PCB of FIG. 8B has an erected part extending along the PCB part, and electronic parts are installed on the erected parts in FIG. 8C;

BEST MODE FOR CARRYING OUT THE INVENTION

Figure 1:
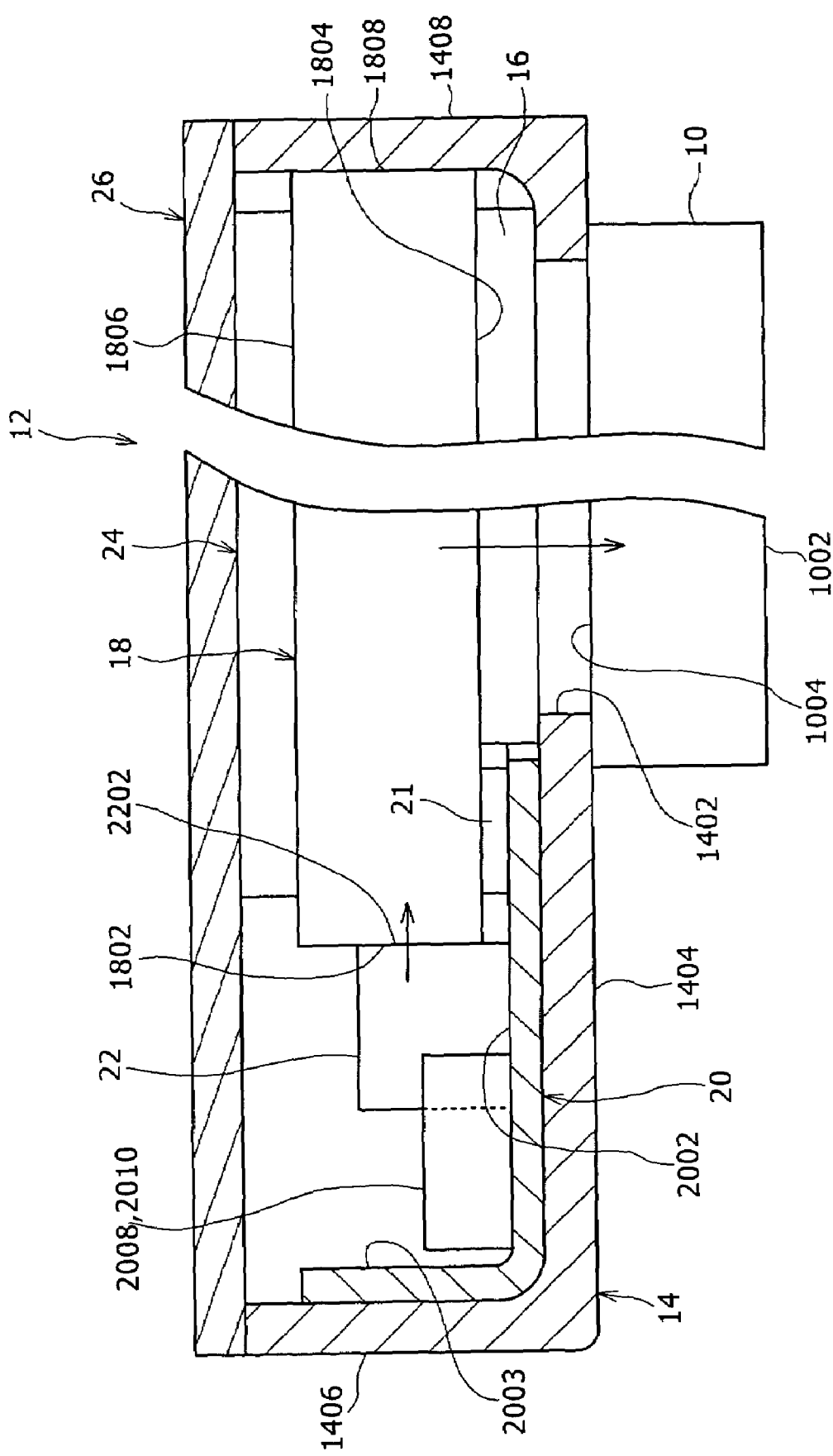
FIG. 1 is a sectional view to show the construction of the liquid crystal display of the first embodiment of the present invention.

Next, embodiments of the present invention will be described by referring to the drawings.

Figure 2:
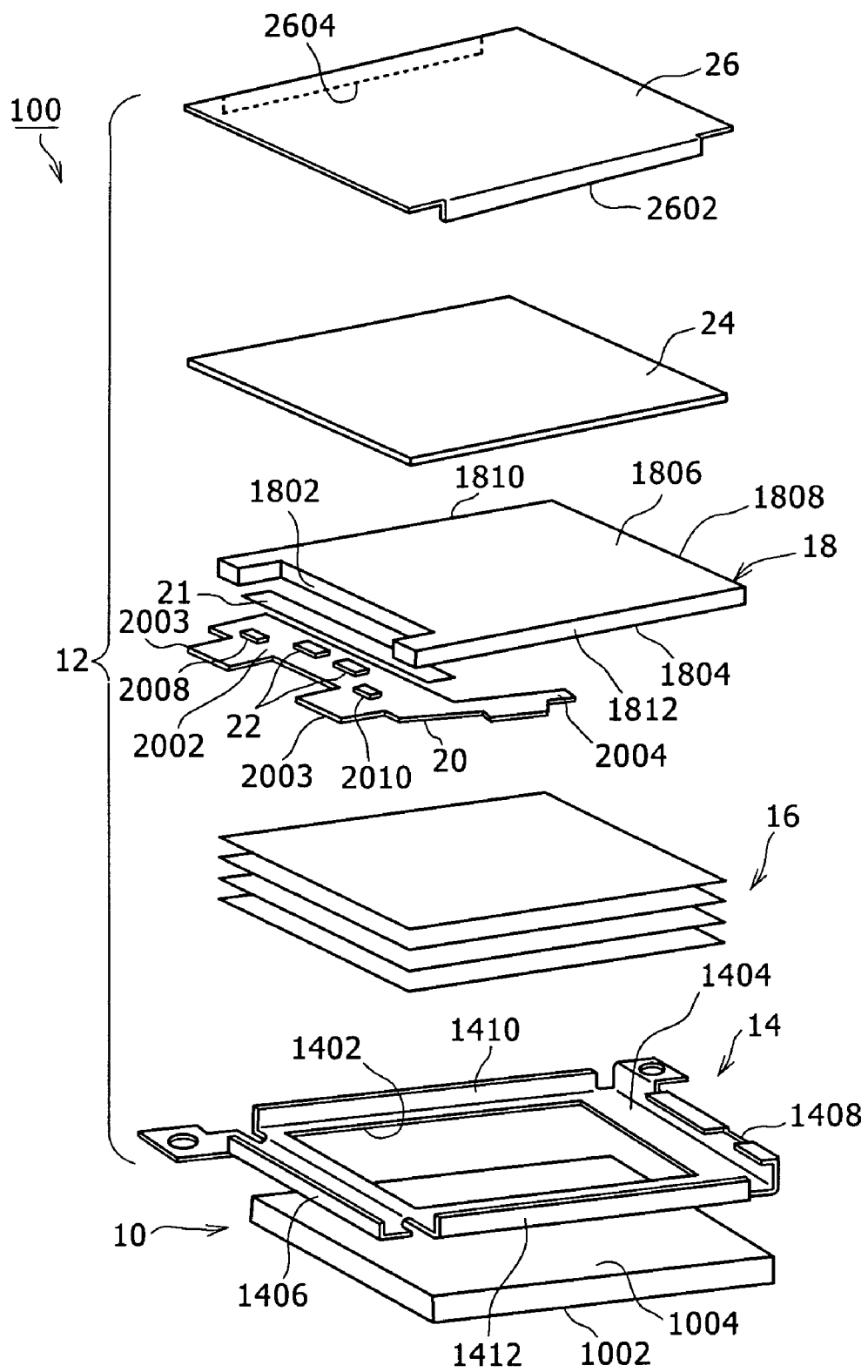
FIG. 2 is an exploded perspective view to show the construction of the liquid crystal display of the first embodiment of the present invention.
Figure 3:
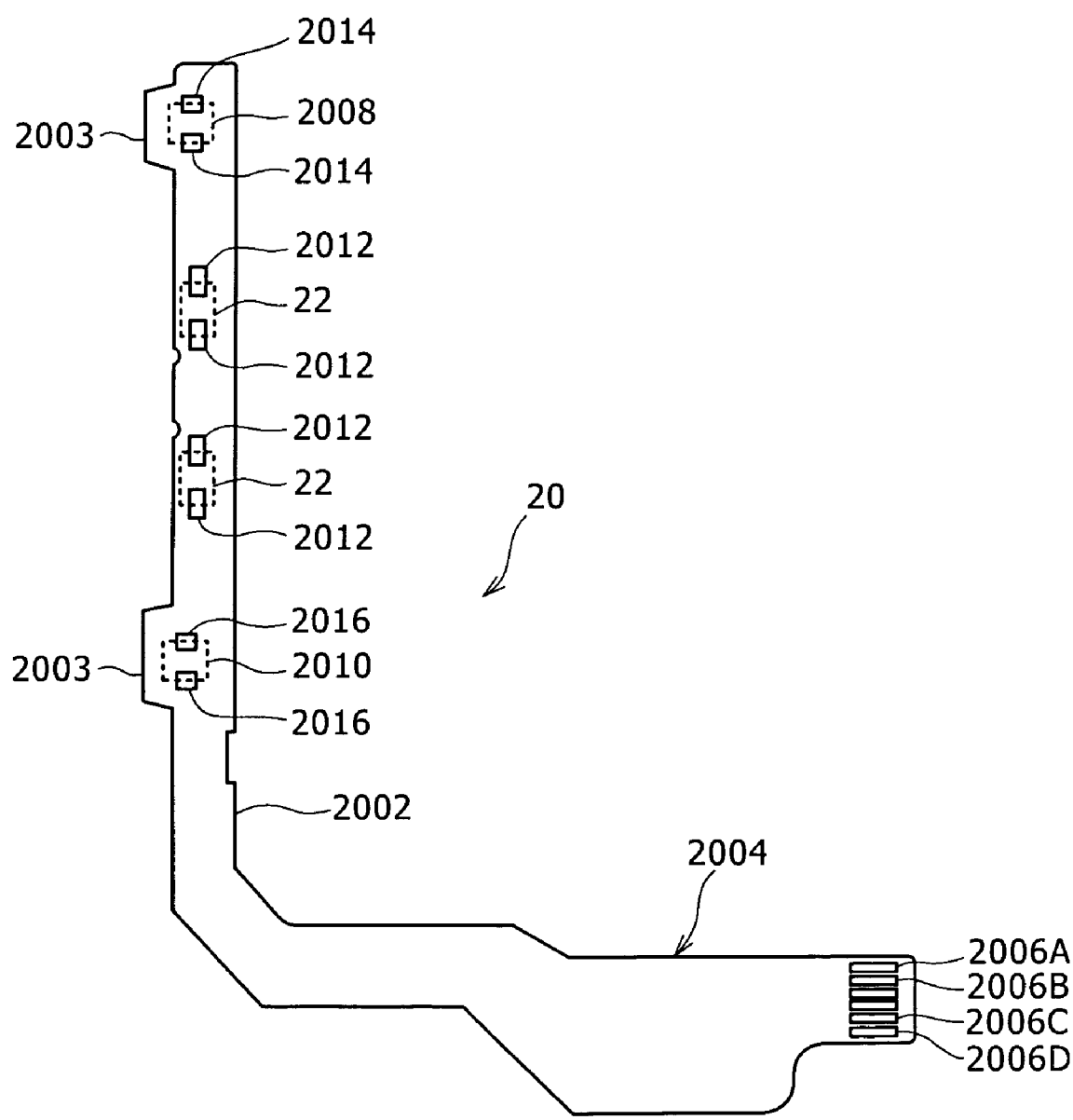
FIG. 3 is a plan view of the flexible PCB.
Figure 4:
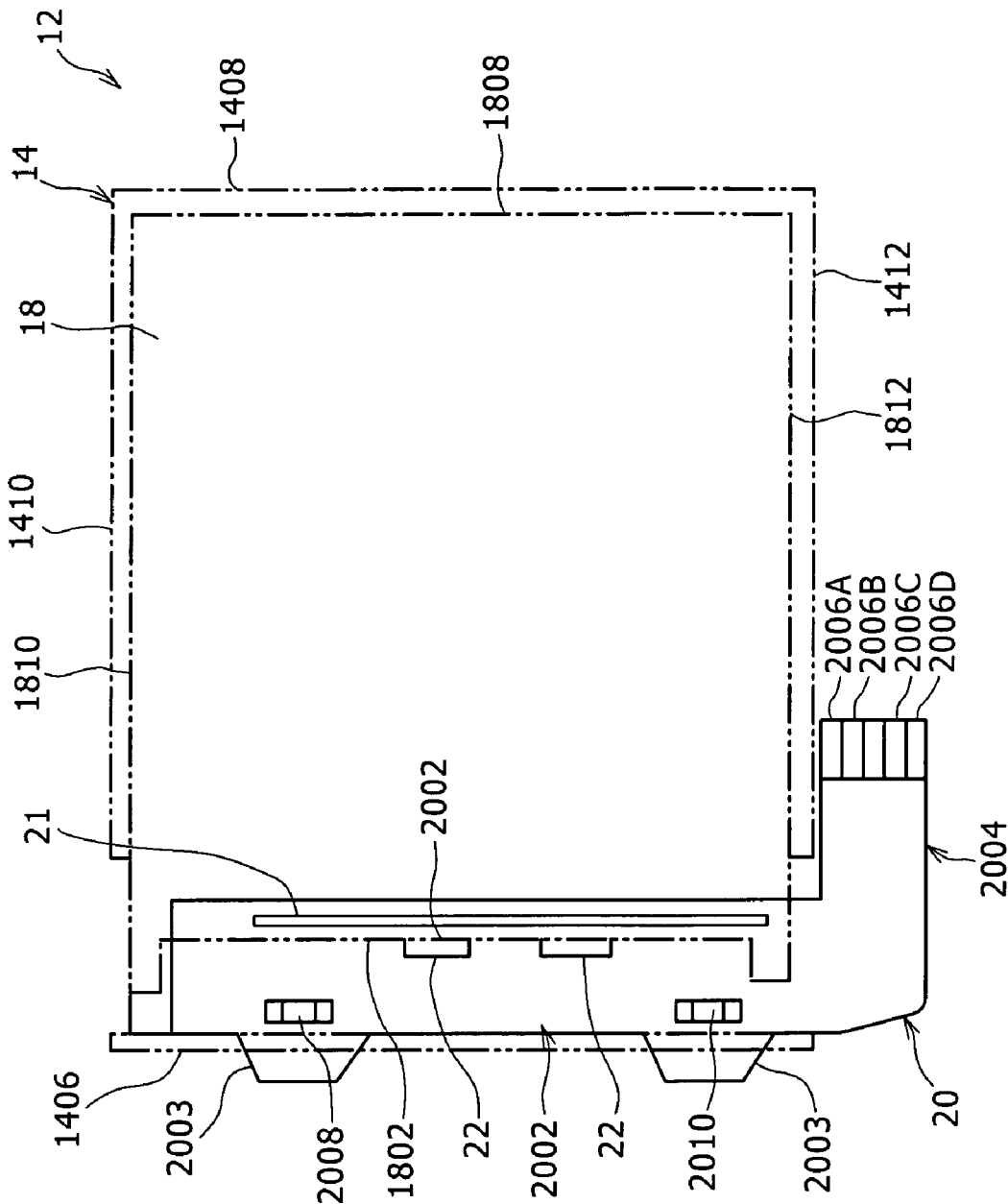
FIG. 4 is an illustration to show the positional relation between the flexible PCB and the light-guiding plate.
Figure 5:
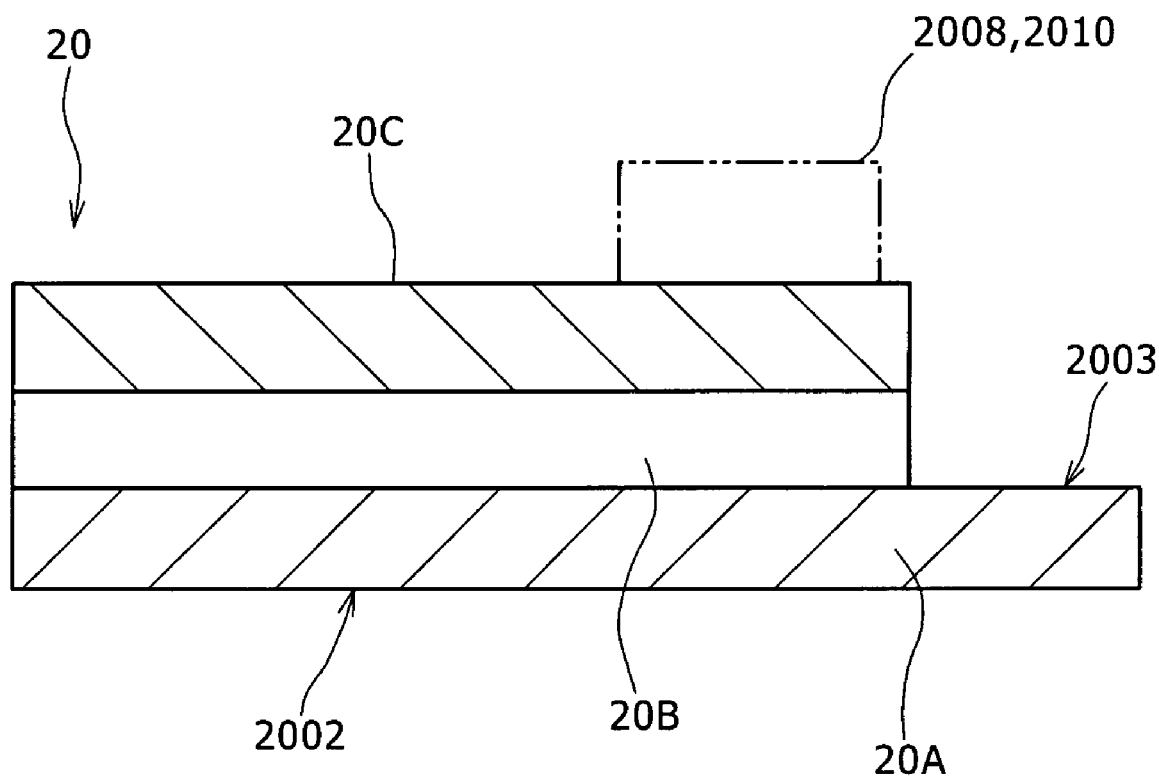
FIG. 5 is a sectional view of the flexible PCB.
Figure 6:
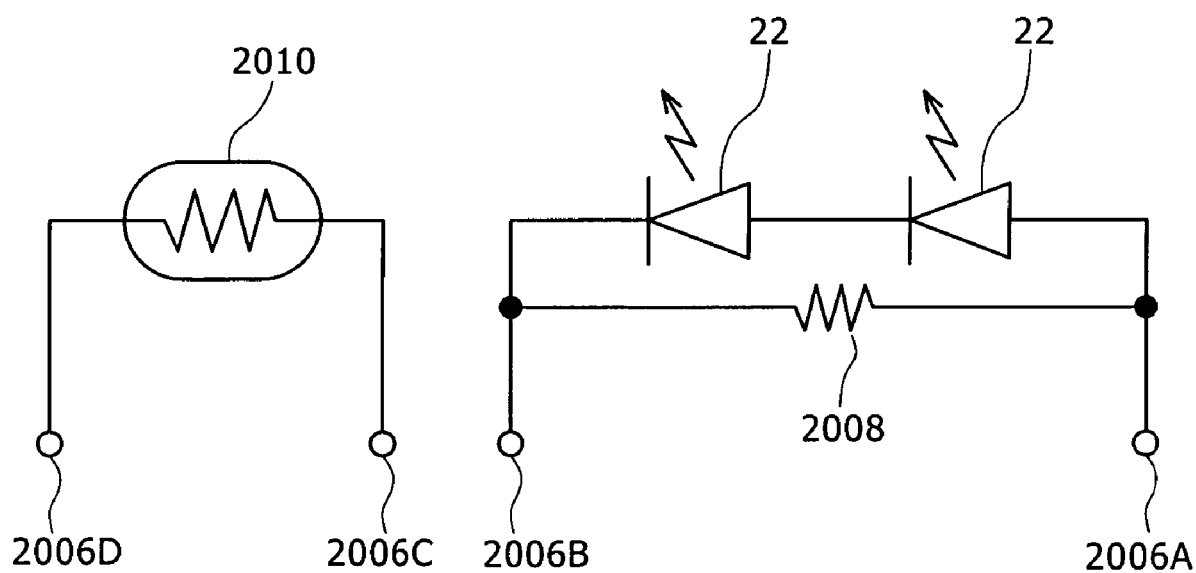
FIG. 6 shows circuit diagrams of circuits formed on the flexible PCB.

FIG. 1 is a sectional view to show the construction of the liquid crystal display of the first embodiment of the present invention. FIG. 2 is an exploded perspective view to show the construction of the liquid crystal display of FIG. 1. FIG. 3 is a plan view of the flexible PCB (printed circuit board) of FIG. 2. FIG. 4 is an illustration to show the positional relation between the flexible PCB and the light-guiding plate of FIG. 2. FIG. 5 is a sectional view of the flexible PCB of FIG. 2. FIG. 6 shows circuit diagrams of circuits formed on the flexible PCB of FIG. 2.

As shown in FIG. 2, the liquid crystal display 100 comprises a liquid-crystal panel 10 and a back-light device 12.

The liquid-crystal panel 10 includes a transmission-type liquid-crystal displaying device in the shape of a rectangular plate. The liquid-crystal panel 10 has a displaying surface 1002 on which images are displayed and a back surface 1004 which is opposite to the displaying surface 1002. The back-light device 12 sheds light on the back surface 1004 and the light penetrates the liquid-crystal panel 10 toward the displaying surface 1002; thus, images are displayed on the displaying surface 1002.

The back-light device 12 has a front frame 14 and a rear frame 26. There are provided four optical sheets 16, a light-guiding plate 18, a flexible PCB 20, two light sources 22, and a reflecting sheet 24 between the front and rear frames 14 and 26.

The light-guiding plate 18 is in the shape of a rectangular plate and has four sides facing in directions perpendicular to the directions of its thickness. One of them is formed as an incident surface 1802 to allow light to enter. Another side is formed as a first side 1808 opposite to the incident surface 1802. The remaining two sides are formed as second and third sides 1810 and 1812 opposite to each other between the incident surface 1802 and the first side 1808.

The light-guiding plate 18 has two surfaces facing in the directions of its thickness. One of them is formed as a light-radiating surface 1804 to radiate light. The other is formed as a back surface 1806.

Light enters the light-guiding plate 18 through the incident surface 1802 and is diffused in the light-guiding plate 18 and radiated from the light-radiating surface 1804. The light-guiding plate 18 is made of acrylic resin.

The front and rear frames 14 and 26 house and hold the light-guiding plate 18 and the flexible PCB 20.

The front frame 14 has (i) a supporting wall 1404 which is rectangular as seen from above and supports the light-guiding plate 18 and the flexible PCB 20, (ii) a rectangular window 1402 which is formed approximately in the center of the supporting wall 1404 and allows the light-radiating surface 1804 of the light-guiding plate 18 to face the optical sheets 16, and (iii) first to fourth erected walls 1406, 1408, 1410, and 1412 which are erected on the four sides of the supporting wall 1404. The first and second erected walls 1406 and 1408 face each other. The third and fourth erected walls 1410 and 1412 face each other. The front frame 14 is made of a metal.

The distance between the incident surface 1802 and the first side 1808 is shorter than the distance between the first and second erected walls 1406 and 1408. The distance between the second side 1810 and the third side 1812 is determined so that they come into contact with the third and fourth erected walls 1410 and 1412.

As shown in FIG. 1, the flexible PCB 20 is disposed on the light-radiating surface 1804, in the vicinity of the incident surface 1802. The flexible PCB 20 is pasted onto the light-guiding plate 18 through the medium of both-sides adhesive tape 21.

As shown in FIGS. 1 to 4, the flexible PCB 20 has a belt-shaped PCB part 2002 and two erected parts 2003. The PCB part 2002 is disposed at the portion of the supporting wall 1404 facing the incident surface 1802 and extends straightly along the incident surface 1802. The erected parts 2003 are erected on the far side of the PCB part 2002 away from the incident surface 1802 at an interval in a direction of the extension of the PCB part 2002. FIGS. 2 and 3 show the state of the flexible PCB 20 before it is fitted into the front frame 14, the PCB part 2002 and the erected parts 2003 being in the same plane.

As shown FIG. 5, the flexible PCB 20 comprises (i) a base film 20A, (ii) a copper foil 20B which is formed on the base film 20A and constitute's a pattern part, and (iii) a cover lay 20C which covers the copper foil 20B. The base film 20A and the cover lay 20C are made of an insulating material such as polyimide. Only the base film 20A extends out of the PCB part 2002 to form the erected parts 2003.

A resistor 2008 and a thermistor 2010 as electronic parts are installed on portions of the top surface of the PCB part 2002 corresponding to the erected parts 2003. The two light sources 22 are disposed at an interval in a direction of the extension of the PCB part 2002, between the resistor 2008 and the thermistor 2010.

In FIG. 3, the reference numeral 2012 represents four pattern parts to be joined to terminal parts of the light sources 22 with solder. The reference numeral 2014 represents two pattern parts to be joined to terminal parts of the resistor 2008. The reference numeral 2016 represents two pattern parts to be joined to terminal parts of the thermistor 2010.

As shown in FIG. 3, a wiring part 2004 extends from one end of the PCB part 2002 in a direction perpendicular to the directions of extension of the PCB part 2002. The tip of the wiring part 2004 is provided with four terminals 2006A to D.

The light sources 22, resistor 2008, and thermistor 2010 installed on the flexible PCB 20 constitute the circuits shown in FIG. 6.

Namely, the two light sources 22 are connected in series and the resistor 2008 is connected in parallel with them. The resistor 2008 is connected to the terminals 2006A and 2006B. The resistor 2008 is a protective resistor to prevent overcurrents through the two light sources 22.

The thermistor 2010 is provided independent of the light sources 22 and the resistor 2008 and connected to the terminals 2006C and 2006D. The thermistor 2010 detects the changes of temperature of the light sources 22 as the changes of resistance.

The terminals 2006A to D are connected to a light-source driver circuit (not shown), which controls the light-source driving current through the terminals 2006A and 2006B based on the changes of the current through the terminals 2006C and 2006D.

As shown in FIGS. 1 and 2, the four optical sheets 16 are of the same rectangular shape and the same size, piled up, and put between the supporting wall 1404 of the front frame 14 and the light-radiating surface 1804 of the light-guiding plate 18. The four optical sheets 16 diffuse the light radiated from the light-radiating surface 1804 of the light-guiding plate 18 and guide the light toward the liquid-crystal panel 10.

The reflecting sheet 24 is rectangular and put on the back surface 1806 of the light-guiding plate 18 and reflects the light radiated from the back surface 1806 toward the light-radiating surface 1804.

The two light sources 22 are white-light emitting diodes and constituted as chips in the shape of a rectangular plate. Each light source 22 has a light-radiating surface 2202, which is put into close contact with the incident surface 1802 of the light-guiding plate 18.

While the first side 1808 of the light-guiding plate 18 is in contact with the second erected wall 1408, the flexible PCB 20 and the light-guiding plate 18 are fitted into the front frame 14. Accordingly, the light-radiating surface 1804 of the light-guiding plate 18 is put on the four optical sheets 16 on the supporting wall 1404 and the PCB part 2002 is put on the supporting wall 1404. At the time, the erected parts 2003 are bent by the first erected wall 1406. Thus, the width of the erected parts 2003 is so determined that they are bent by the first erected wall 1406 and press the light-radiating surface 2202 of the light sources 22 to the incident surface 1802 of the light-guiding plate 18.

Thus, as shown in FIG. 1, the light-guiding plate 18 is positioned with respect to the front frame 14 in the direction defined by the incident surface 1802 of the light-guiding plate 18 and the first side surface 1804 between the first and second erected walls 1406, and 1408 by the first side 1808 in contact with the second erected wall 1408 and the erected parts 2003 in contact with the first erected wall 1406. In this state, the elastic erected parts 2003 bent by the first erected wall 1406 press the light-radiating surface 2202 of the light sources 22 to the incident surface 1802 of the light-guiding plate 18. Namely, the light-radiating surface 2202 of the light sources 22 are pressed to the incident surface 1802 of the light-guiding plate 18 by the elasticity of the erected parts 2003.

Besides, when the light-guiding plate 18 and the flexible PCB 20 are fitted into the front frame 14, the second and third sides 1810 and 1812 of the light-guiding plate 18 come in contact with the second and third sides 1810 and 1812 of the front frame 14. Thus, the light-guiding plate 18 is positioned with respect to the front frame 14 in the direction defined between the second side 1810 and the third side 1812 of the light-guiding plate 18.

Moreover, as shown in FIGS. 1 and 3, when the light-guiding plate 18 and the flexible PCB 20 are fitted into the front frame 14, the erected part 2003 beside the resistor 2008 is positioned between the first erected wall 1406 of the front frame 14 and the resistor 2008/its terminal parts and the erected part 2003 beside the thermistor 2010 is positioned between the first erected wall 1406 of the front frame 14 and the thermistor 2010/its terminal parts.

Then, the reflecting sheet 24 is put on the back surface 1806 of the light-guiding plate 18. Next, the rear frame 26 is put on the reflecting sheet 24 and the front and rear frames 14 and 26 are joined together. Thus, the four optical sheets 16, light-guiding plate 18, and reflecting sheet 24 are caught and fixed between the front and rear frames 14 and 26. The rear frame 26 has erected strips 2602 and 2604 on its two opposite sides, which engage, with the third and fourth erected walls 1410 and 1412 of the front frame 14 to join the front and rear frames 14 and 26 together. The front and rear frames 14 and 26 are electrically connected to the ground potential of an electronic device.

With the above construction, the back-light device 12 illuminates the liquid-crystal panel 10 as follows.

When the light sources 22 are fed with a driving current, they radiate light from their light-radiating surfaces 2202. The light enters the light-guiding plate 18 through its incident surface 1802 and is diffused in various directions.

Part of the light, is guided to the liquid-crystal panel 10 through the light-radiating surface 1804, optical sheets 16, and window 1402. The remainder of the light goes to the reflecting sheet 24 through the back surface 1806, is reflected by the reflecting sheet 24, passes through the light-guiding plate 18, and is guided to the liquid-crystal panel 10 through the light-radiating surface 1804, optical sheets 16, and window 1402.

Thus, the liquid-crystal panel 10 is illuminated from its back surface 1004's side by the back-light device 12.

Next, the workings and effect of the back-light device 12 will be described below.

As shown in FIG. 1, the two erected parts 2003 are bent by the first erected wall 1406 of the front frame 14; accordingly, they exert force to press the light-radiating surfaces 2202 of the light sources 22 to the incident surface 1802 of the light-guiding plate 18, putting the light-radiating surfaces 2202 into close contact with the incident surface 1802. Thus, the light radiated from the light-radiating surfaces 2202 of the light sources 22 enters the incident surface 1802 of the light-guiding plate 18 efficiently.

Besides, as the PCB part 2002 and the erected parts 2003 are formed as a single piece, the number of parts and the cost are reduced.

Moreover, the erected parts 2003 are simply and easily bent just by fitting the flat flexible PCB 20, which has the PCB part 2002 and the erected parts 2003 in the same plane, into the front frame 14. Thus, the cost is further reduced. The erected parts 2003 may be bent before the flexible PCB 20 is fitted into the front frame 14. However, if the erected parts 2003 are bent when the flexible PCB 20 is fitted into the front frame 14, the bent erected parts 2003 cope very easily with the dimensional error of the front frame 14 too, putting the light-radiating surface 2202 into closer contact with the incident surface 1802.

In addition, because the two erected parts 2003 are put into close contact with the first erected wall 1406 of the front frame 14, the heat of the light sources 22 is conducted not only from the PCB part 2202 to the supporting wall 1404 but also from the erected parts 2003 to the first erected wall 1406. Thus, the heat of the light sources 22 is dissipated efficiently.

Figure 7:
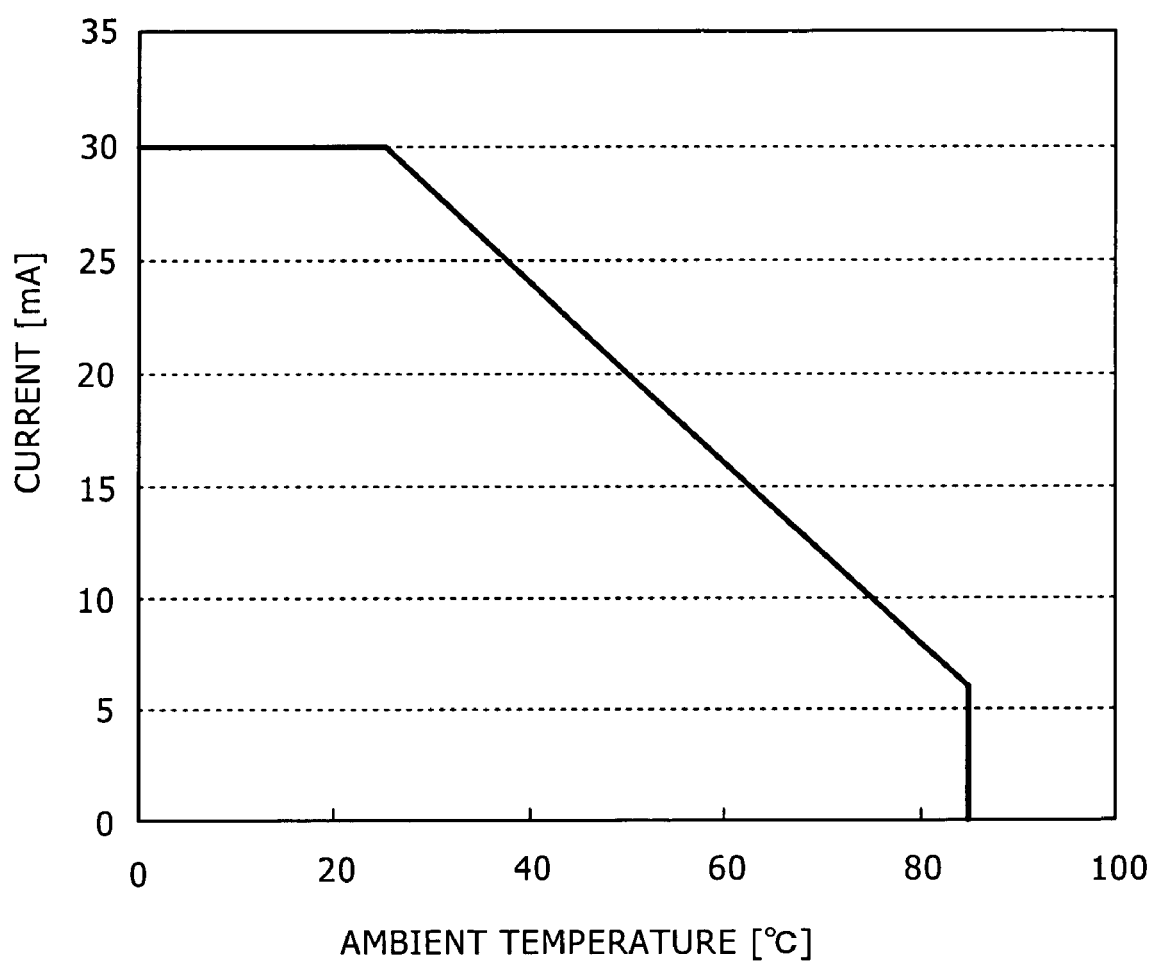
FIG. 7 is a graph showing the relation between the ambient temperature of the light sources and the current feedable to them.

FIG. 7 is a graph showing the relation between the ambient temperature of the light sources 22 and the current which can be fed to the light sources 22.

As shown in FIG. 7, if the ambient temperature of the light sources 22 is reduced by improving the heat-dissipating effect as mentioned above, the current feedable to the light sources 22 is raised, giving more freedom to the design of the back-light device 12.

As shown in FIG. 1, when the PCB part 2002 of the flexible PCB 20 is put on the supporting wall 1404 of the front frame 14, the erected part 2003 beside the resistor 2008 is positioned between the first erected wall 1406 and the resistor 2008/its terminal parts. Thus, the resistor 2008 is separated and insulated from the front frame 14.

In the same way, when the PCB part 2002 of the flexible PCB 20 is put on the supporting wall 1404 of the front frame 14, the erected part 2003 beside the thermistor 2010 is positioned between the first erected wall 1406 and the resistor 2008/its terminal parts. Thus, the thermistor 2010 is separated and insulated from the front frame 14 without fail.

Thus, the resistor 2008 and the thermistor 2010 are prevented from coming into electric contact with the front frame 14 to cause trouble.

Now, a comparison will be made between the present embodiment and a prior art device.

Figure 10:
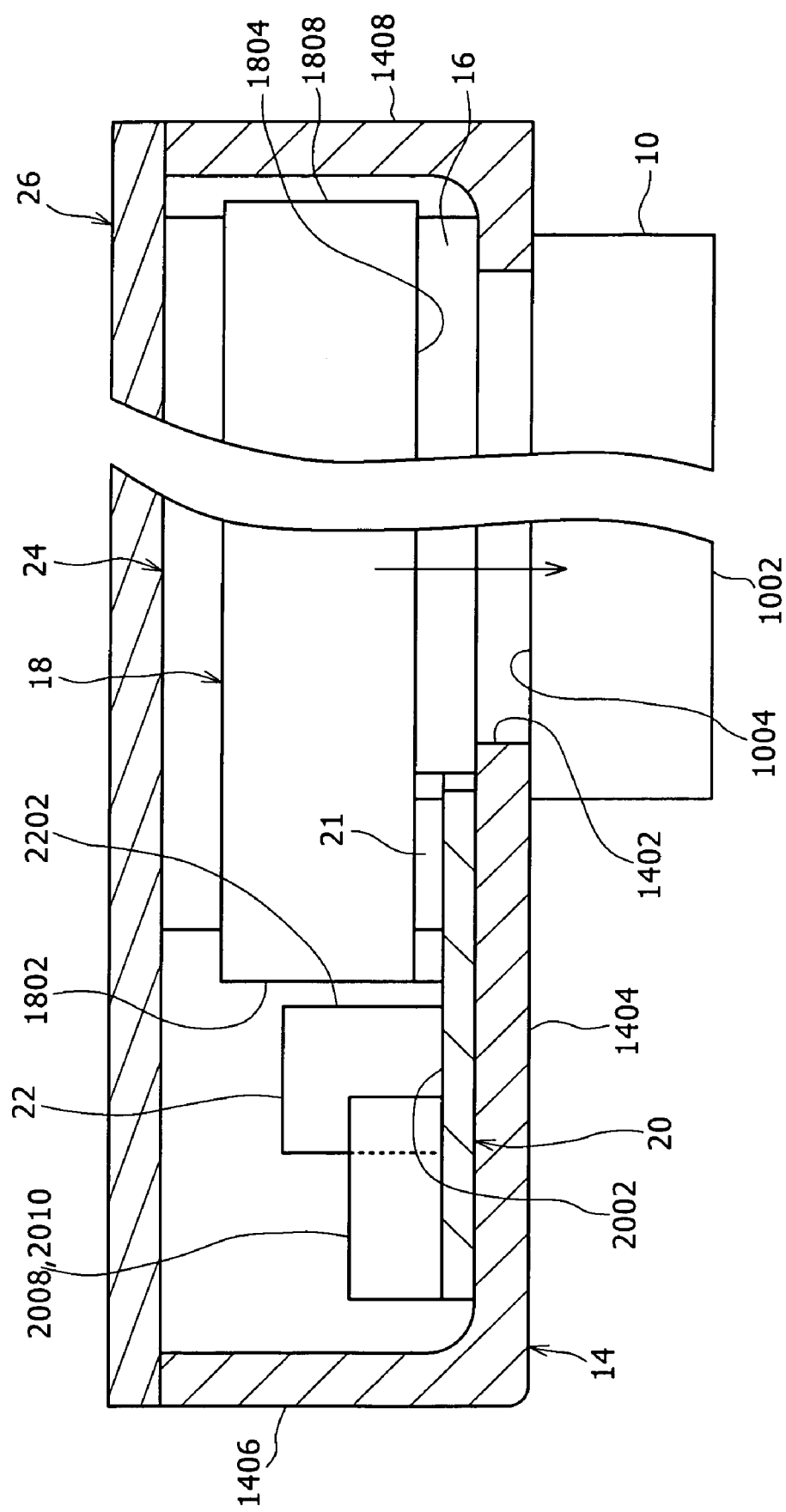
FIG. 10 shows the construction of a back-light device of prior art.

FIG. 10 shows the construction of a back-light device of prior art. Since there are components identical to those in FIG. 1, like parts are given like reference characters and the explanation thereof will be omitted.

The back-light device of FIG. 10 differs from the present embodiment in that the erected parts 2003 of the flexible PCB 20 are not provided.

Therefore, the light-radiating surface 2202 of the light source 22 is not pressed to the incident surface 1802 of the light-guiding plate 18, leaving a gap between the light-radiating surface 2202 and the incident surface 1802. Thus, the light radiated from the light-radiating surface 2202 does not enter the incident surface 1802 efficiently.

Also, the heat of the light source 22 is only conducted from the PCB part 2002 to the supporting wall 1404. Thus, the heat of the light source 22 is not dissipated efficiently.

Further, the resistor 2008 and the thermistor 2010 are not reliably prevented from coming into contact with the first erected wall 1406 of the front frame 14.

Thus, the present embodiment is far superior to the prior art device in that the light from the light sources enters the light-guiding plate efficiently, the heat of the light sources is dissipated efficiently, and the insulation between the electronic parts and the frame is secured, without increasing the number of parts and the cost.

In the present embodiment, as shown in FIG. 5, the erected part 2003 is thinner than the PCB part 2002 and, therefore, a case where the erected part 2003 is easier to bend than the PCB part 2002 has been described. However, the present invention is naturally applied to a case where the erected part 2003 is as thick as the PCB part 2002. In such a case, part of a basal portion of the erected part 2003 may be made thin for helping the erected part 2003 to bend when it is fitted into the front frame 14.

FIGS. 8A, 8B, and 8C show other embodiments of the erected parts 2003 of the flexible PCB 20. The flexible PCB 20 of FIG. 8A has three erected parts 2003. The flexible PCB of FIG. 8B has an erected part 2003 extending along the PCB part 2002. In FIG. 8C, electronic parts are installed on the erected parts 2003. Further, FIGS. 8A, 8B, and 8C show that the PCB part 2002 and the erected parts 2003 are in the same plane.

As shown in FIG. 8A, when the erected part 2003 is provided between the two erected parts 2003 corresponding to the resistor 2008 and the thermistor 2010, the area through which the heat of the light sources 22 is conducted to the first erected wall 1406 increases compared to the one in the first embodiment. Thus, the heat of the light sources 22 is dissipated more efficiently. Also, when the three erected parts 2003 are bent by the first erected wall 1406 of the front frame 14, the elasticity which presses the light-radiating surface 2202 of the light sources 22 to the incident surface 1802 of the light-guiding plate 18 increases compared to the one in the first embodiment, putting the light-radiating surface 2202 into closer contact with the incident surface 1802. Thus, the light radiated from the light-radiating surface 2202 of the light source 22 enters the incident surface 1802 of the light-guiding plate 18 more efficiently.

As shown in FIG. 8B, when there is provided the erected part 2003 extending along the PCB part 2002, the area through which the heat of the light sources 22 is conducted to the first erected wall 1406 increases compared to the example in FIG. 8A. Thus, the heat of the light sources 22 is dissipated more efficiently. Moreover, when the erected part 2003 is bent by the first erected wall 1406 of the front frame 14, the elasticity which presses the light-radiating surface 2202 of the light source 22 to the incident surface 1802 of the light-guiding plate 18 also increases compared to the example in FIG. 8A. Thus, the light radiated from the light-radiating surface 2202 of the light source 22 enters the incident surface 1802 of the light-guiding plate 18 more efficiently.

As shown in FIG. 8C, when electronic parts such as the resistor 2008 and the thermistor 2010 are installed on surfaces opposite to the surfaces of the erected parts 2003 in contact with the first erected wall 1406, like in the first embodiment, the light radiated from the light sources 22 enters the light-guiding plate 18 efficiently, the heat of the light sources 22 is dissipated efficiently, the insulation between the electronic parts and the frame is secured, and space of the PCB part 2002 required for the installation of the electronic parts can be reduced. Thus, by reducing the area of the PCB part 2002, the reduction of the space and cost is achieved efficiently.

In these embodiments shown in FIGS. 8A, 8B, and 8C, also, the erected parts 2003, may be bent and erected in advance with respect to the PCB part 2002.

Further, in the first embodiment and other embodiments shown in FIGS. 8A, 8B, and 8C, if a copper-foil pattern is formed on a portion of the erected part 2003, the heat of the light sources 22 can be conducted to the frame 14 through the copper-foil pattern and the heat of the light sources 22 is dissipated efficiently. The copper-foil pattern may be formed on a front surface, a back surface, or both the surfaces of the erected part 2003. Alternatively, it may be formed in the middle portion in the direction of the thickness of the erected part 2003, namely, between the base film and the overlay.

Figure 9:
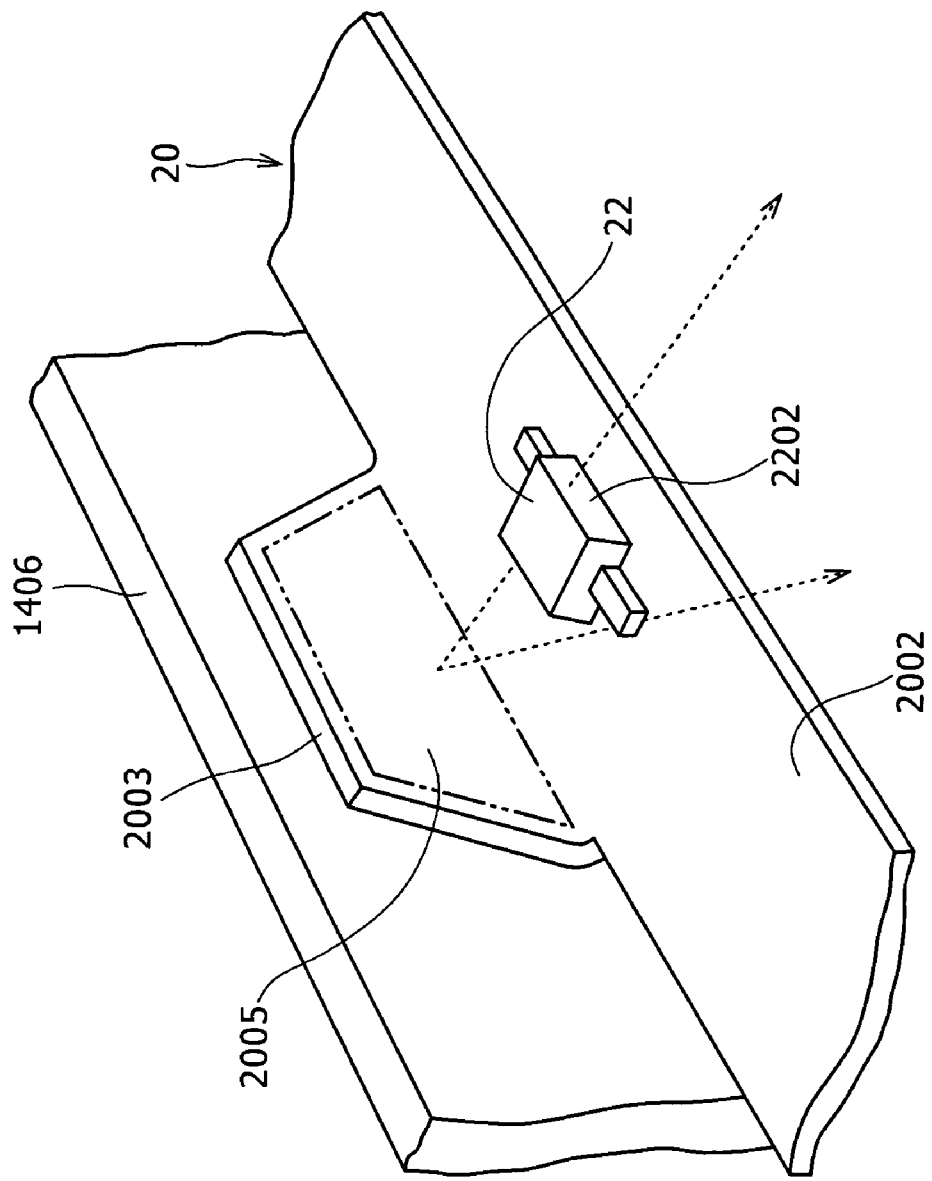
FIG. 9 shows still another embodiment of the erected parts of the flexible PCB.

FIG. 9 shows still another embodiment of the erected part 2003 of the flexible PCB 20.

As shown in FIG. 9, in this embodiment, a reflecting material 2005 such as a copper-foil pattern reflecting light toward the incident surface 1802 (not shown in FIG. 9) of the light-guiding plate 18 is formed on the surface of the erected part 2003 of the flexible PCB 20 facing the light source 22.

With the above construction, as indicated by dashed lines in FIG. 9, the light radiated from the surface opposite to the light-radiating surface 2202 of the light source 22 is reflected by the reflecting material 2005 to be guided to the incident surface 1802. Thus, the light radiated from the light source 22 enters the incident surface 1802 of the light-guiding plate 18 efficiently.

Further, the back-light device and liquid crystal display of the present invention can be applied to various electronic devices such as digital video cameras, digital still cameras, and mobile phones.

INDUSTRIAL APPLICABILITY

As described above, according to the present invention, it is possible to provide a back-light device and a liquid crystal display whose manufacturing costs are low and wherein the light from light sources is guided to a light-guiding plate efficiently and the heat of the light sources is dissipated efficiently.

Also, according to the present invention, it is possible to provide a back-light device and a liquid-crystal display whose manufacturing costs are low and wherein the electronic parts are efficiently insulated from the frame.

The invention claimed is:

1. A back-light device for shedding light on the back of a liquid-crystal panel, the back-light device comprising:
    a substantially rectangular light-guiding plate, the light-guiding plate including a top surface, a bottom surface, and at least four side surfaces, the at least four side surfaces facing in a direction substantially perpendicular to a direction of a thickness of the light-guiding plate;
    wherein the at least four side surfaces include an incident surface configured to allow light to enter and a first side surface opposite the incident surface; and
    wherein one of the top and bottom surfaces of the light-guiding plate is a light-radiating surface;
    a flexible PCB (printed circuit board) attached to part of the light-guiding plate in a vicinity of the incident surface;
    a plurality of light sources installed on the flexible PCB, each of the plurality of light sources including a light-radiating surface which contacts the incident surface of the light-guiding plate; and
    a frame configured to house and hold the light-guiding plate and the flexible PCB,
    wherein the frame includes a supporting wall configured to support the light-guiding plate, a window provided in the supporting wall and through which the light-radiating surface of the light-guiding plate is seen, and erected walls which are erected at the periphery of the supporting wall;
    wherein the erected walls include a first erected wall substantially perpendicular to the supporting wall, and a second erected wall substantially perpendicular to the supporting wall and located opposite the first erected wall;
    wherein the flexible PCB includes a PCB part on which the light sources are installed and erected parts which are erected on the far side of the PCB part away from the incident surface of the light-guiding plate;
    wherein the light-guiding plate is positioned in the frame such that the first side surface of the light-guiding plate contacts the second erected wall; and
    wherein the flexible PCB is positioned in the frame such that the erected parts contact the first erected wall of the frame and the flexible PCB biases at least one of the plurality of light sources against the incident surface of the light guiding plate.

2. A back-light device according to claim 1, wherein the light-radiating surface of the light source is pressed to the incident surface of the light-guiding plate by the erected parts.

3. A back-light device according to claim 1, wherein electronic parts including exposed terminals are installed on the PCB part in the vicinity of the erected part of the flexible PCB.

4. A back-light device according to claim 1, wherein the heat from the plurality of light sources is conducted to the first erected wall of the frame through the erected part of the flexible PCB.

5. A back-light device according to claim 1, wherein a copper-foil pattern is formed on a front surface or a back surface of the erected part of the flexible PCB.

6. A back-light device according to claim 1, wherein a copper-foil pattern is formed in a middle portion of the erected part of the flexible PCB in the of a thickness of the flexible PCB.

7. A back-light device according to claim 1, wherein a reflecting material reflecting light to the incident surface of the light-guiding plate is provided on a surface of the erected part of the flexible PCB facing the plurality of light sources.

8. A back-light device according to claim 1, wherein the flexible PCB is pasted onto the top surface or the bottom surface of the light-guiding plate in the direction of the thickness of the light-guiding plate.

9. A back-light device according to claim 1, wherein electronic parts are installed on a surface of the erected parts opposite to a surface of the erected parts in contact with the first erected wall of the frame.

10. A back-light device according to claim 1, wherein the light-guiding plate includes second and third side surfaces opposite to each other between the incident surface and the first side surface,
    wherein the supporting wall of the frame is substantially rectangular;
    wherein the erected walls include a third erected wall and a fourth erected wall, the first, second, third and fourth erected walls erected on four sides of the supporting wall, the first and second erected walls facing each other and the third and fourth erected walls facing each other;
    wherein the light-guiding plate is positioned in the frame such that the first side surface is in contact with the second erected wall and the second and third side surfaces are in contact with the third and fourth erected walls, respectively.

11. A back-light device according to claim 1, wherein the frame further comprises a front frame including the supporting wall, the window, and the erected walls and a rear frame covering the top or bottom surface of the light-guiding plate and the flexible PCB on the opposite surface of the light-guiding plate in the direction of the thickness of the light-guiding plate and joined to the front frame.

12. A back-light device according to claim 1,
    wherein the first side surface of the light-guiding plate opposite to the incident surface is in contact with the first erected wall of the frame and the flat flexible PCB and the light-guiding plate are fitted into the frame, and
    wherein a width of the erected parts of the flexible PCB include a width such that the erected parts are bent with respect to the PCB part by the first erected wall of the frame and press the light-radiating surface of the light source to the incident surface of the light-guiding plate.

13. A liquid crystal display comprising a liquid-crystal panel and a back-light device for shedding light on the back of the liquid-crystal panel, the back-light device comprising:
a substantially rectangular light-guiding plate, the light-guiding plate including a top surface, a bottom surface, and at least four side surfaces, the at least four side surfaces facing in a direction substantially perpendicular to a direction of a thickness of the light-guiding plate;
wherein the at least four side surfaces include an incident surface configured to allow light to enter and a first side surface opposite the incident surface; and
wherein one of the top and bottom surfaces of the light-guiding plate is a light-radiating surface;
a flexible PCB attached to part of the light-guiding plate in a vicinity of the incident surface;
a plurality of light sources installed on the flexible PCB, each of the plurality of light sources including a light-radiating surface which contacts with the incident surface of the light-guiding plate; and
a frame configured to house and hold the light-guiding plate and the flexible PCB,
wherein the frame includes a supporting wall configured to support the light-guiding plate, a window provided in the supporting wall and through which the light-radiating surface of the light-guiding plate is seen, and erected walls which are erected at the periphery of the supporting wall;
wherein the erected walls include a first erected wall substantially perpendicular to the supporting wall, and a second erected wall substantially perpendicular to the supporting wall and located opposite the first erected wall;
wherein the flexible PCB includes a PCB part on which the light sources are installed and erected parts which are erected on the far side of the PCB part away from the incident surface of the light-guiding plate;
wherein the light-guiding plate is positioned in the frame such that the first side surface of the light-guiding plate contacts the second erected wall; and
wherein the flexible PCB is positioned in the frame such that the erected parts contact the first erected wall of the frame and the flexible PCB biases at least one of the plurality of light sources against the incident surface of the light guiding plate.

14. A liquid crystal display according to claim 13, wherein the light-radiating surface of the light source is pressed to the incident surface of the light-guiding plate by the erected parts.

15. A liquid crystal display according to claim 13, wherein electronic parts including exposed terminals are installed on the PCB part in the vicinity of the erected part of the flexible PCB.

16. A liquid crystal display according to claim 13, wherein heat from the plurality of light sources is conducted to the first erected wall of the frame through the erected part of the flexible PCB.

17. A liquid crystal display according to claim 13, wherein a copper-foil pattern is formed on a front surface or a back surface of the erected part of the flexible PCB.

18. A liquid crystal display according to claim 13, wherein a copper-foil pattern is formed in a middle portion of the erected part of the flexible PCB in the of a thickness of the flexible PCB.

19. A liquid crystal display according to claim 13, wherein a reflecting material reflecting light to the incident surface of the light-guiding plate is provided on a surface of the erected part of the flexible PCB facing the plurality of light sources.

20. A liquid crystal display according to claim 13, wherein the flexible PCB is pasted onto the top surface or the bottom surface of the light-guiding plate in the direction of the thickness of the light-guiding plate.

21. A liquid crystal display according to claim 13, wherein electronic parts are installed on a surface of the erected parts opposite to a surface of the erected parts in contact with the first erected wall of the frame.

22. A liquid crystal display according to claim 13,
wherein the light-guiding plate includes second and third side surfaces opposite to each other between the incident surface and the first side surface,
wherein the supporting wall of the frame is substantially rectangular;
wherein the erected walls include a third erected wall and a fourth erected wall, the first, second, third and fourth erected walls erected on four sides of the supporting wall, the first and second erected walls facing each other and the third and fourth erected walls facing each other;
wherein the light-guiding plate is positioned in the frame such that the first side surface is in contact with the second erected wall and the second and third side surfaces are in contact with the third and fourth erected walls, respectively.

23. A liquid crystal display according to claim 13, wherein the frame further comprises a front frame including the supporting wall, the window, and the erected walls and a rear frame covering the top or bottom surface of the light-guiding plate and the flexible PCB on the opposite surface of the light-guiding plate in the direction of the thickness of the light-guiding plate and joined to the front frame.

24. A liquid crystal display according to claim 13,
wherein the first side surface of the light-guiding plate opposite to the incident surface is in contact with the first erected wall of the frame and the flat flexible PCB and the light-guiding plate are fitted into the frame, and
wherein a width of the erected parts of the flexible PCB include a width such that the erected parts are bent with respect to the PCB part by the first erected wall of the frame and press the light-radiating surface of the light source to the incident surface of the light-guiding plate.

* * * * *